(12) United States Patent
Choi et al.

(10) Patent No.: US 11,194,080 B2
(45) Date of Patent: Dec. 7, 2021

(54) DIFFRACTIVE OPTICAL ELEMENT AND DEVICE

(71) Applicant: SAMSUNG ELECTRONICS CO., LTD., Suwon-si (KR)

(72) Inventors: Hyun Seok Choi, Seoul (KR); Beom Seok Kim, Seoul (KR); Ju Hyun Kim, Anyang-si (KR); Hoon Song, Yongin-si (KR); Jung Kwuen An, Suwon-si (KR); Sung Dug Kim, Suwon-si (KR); Hong-Seok Lee, Seoul (KR); Sunghyun Han, Pohang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/894,971

(22) Filed: Jun. 8, 2020

(65) Prior Publication Data

US 2021/0011206 A1 Jan. 14, 2021

(30) Foreign Application Priority Data

Jul. 8, 2019 (KR) .................. 10-2019-0082044

(51) Int. Cl.
*G02B 5/18* (2006.01)

(52) U.S. Cl.
CPC ......... *G02B 5/1828* (2013.01); *G02B 5/1814* (2013.01); *G02B 5/1833* (2013.01)

(58) Field of Classification Search
None
See application file for complete search history.

(56) References Cited

U.S. PATENT DOCUMENTS

| 8,339,566 | B2 | 12/2012 | Escuti et al. |
| 8,520,170 | B2 | 8/2013 | Escuti et al. |

(Continued)

FOREIGN PATENT DOCUMENTS

| EP | 3560967 A1 | 10/2019 |
| KR | 101507048 B1 | 3/2015 |

(Continued)

OTHER PUBLICATIONS

Extended European Search Report dated Nov. 27, 2020, of corresponding European Patent Application No. 20184504.7.

(Continued)

*Primary Examiner* — James A Dudek
(74) *Attorney, Agent, or Firm* — Cantor Colburn LLP

(57) ABSTRACT

A diffractive optical element including a diffraction layer including a plurality of optical axes along an in-plane direction, wherein the diffraction layer includes an anisotropic material that satisfies one of Relationship Equations 1A to 3A $\Delta n_1(450\ nm) < \Delta n_1(550\ nm) \leq \Delta n_1(650\ nm)$ Relationship Equation 1A $\Delta n_1(450\ nm) \leq \Delta n_1(550\ nm) < \Delta n_1(650\ nm)$ Relationship Equation 2A $\Delta n_1(450\ nm) = \Delta n_1(550\ nm) = \Delta n_1(650\ nm)$ Relationship Equation 3A wherein, in Relationship Equations 1A to 3A,
$\Delta n_1$ (450 nm) is a birefringence of the anisotropic material at a wavelength of 450 nanometers,
$\Delta n_1$ (550 nm) is a birefringence of the anisotropic material at a wavelength of 550 nanometers, and
$\Delta n_1$ (650 nm) is a birefringence of the anisotropic material at a wavelength of 650 nanometers.

18 Claims, 12 Drawing Sheets

(56) References Cited

U.S. PATENT DOCUMENTS

| | | |
|---|---|---|
| 2015/0079380 A1 | 3/2015 | Muramatsu et al. |
| 2015/0277007 A1 | 10/2015 | Matsuyama et al. |
| 2016/0011353 A1 | 1/2016 | Escuti et al. |
| 2017/0010488 A1 | 1/2017 | Klug et al. |
| 2018/0188631 A1 | 7/2018 | Lu et al. |
| 2019/0056636 A1 | 2/2019 | Cheng et al. |
| 2019/0227375 A1 | 7/2019 | Oh et al. |
| 2020/0013835 A1 | 1/2020 | Muramatsu et al. |
| 2020/0115482 A1 | 4/2020 | Sakamoto et al. |

FOREIGN PATENT DOCUMENTS

| | | |
|---|---|---|
| KR | 1020160112380 A | 9/2016 |
| WO | 2017147112 A1 | 8/2017 |
| WO | 2018123622 A1 | 7/2018 |
| WO | 2018174015 A1 | 9/2018 |
| WO | 2019084334 A1 | 5/2019 |

OTHER PUBLICATIONS

Jianghao Xiong, et al., "Device simulation of liquid crystal polarization gratings," Optics Express, vol. 27, Issue 13, Jun. 24, 2019, pp. 18102-18112.

A

DIFFRACTIVE OPTICAL ELEMENT AND DEVICE

This application claims priority to and the benefit of Korean Patent Application No. 10-2019-0082044, filed in the Korean Intellectual Property Office on Jul. 8, 2019, the content of which is incorporated herein by reference in its entirety.

BACKGROUND

1. Field

A diffractive optical element and a device including the diffractive optical element are disclosed.

2. Description of the Related Art

In the development of highly integrated optical devices, research has been conducted to develop optical devices having a small size and a thin thickness. Among these, it is desirable to develop diffractive optical elements using light diffraction phenomena, and which are applied to optical systems such as lenses or prisms.

SUMMARY

An embodiment provides a diffractive optical element having excellent diffraction efficiency and a wide bandwidth.

Another embodiment provides a device including the diffractive optical element.

According to an embodiment, a diffractive optical element includes a diffraction layer including a plurality of optical axes along an in-plane direction, wherein the diffraction layer includes an anisotropic material that satisfies one of Relationship Equations 1A to 3A.

$$\Delta n_1(450 \text{ nanometers(nm)}) < \Delta n_1(550 \text{ nm}) \leq \Delta n_1(650 \text{ nm}) \quad \text{Relationship Equation 1A}$$

$$\Delta n_1(450 \text{ nm}) \leq \Delta n_1(550 \text{ nm}) < \Delta n_1(650 \text{ nm}) \quad \text{Relationship Equation 2A}$$

$$\Delta n_1(450 \text{ nm}) = \Delta n_1(550 \text{ nm}) = \Delta n_1(650 \text{ nm}) \quad \text{Relationship Equation 3A}$$

In Relationship Equations 1A to 3A, $\Delta n_1$ (450 nm) is birefringence of an anisotropic material at a wavelength of 450 nanometers (nm), $\Delta n_1$ (550 nm) is birefringence of an anisotropic material at a wavelength of 550 nm, and $\Delta n_1$ (650 nm) is birefringence of an anisotropic material at a wavelength of 650 nm.

The optical axis of the diffraction layer may be configured to change periodically along the in-plane direction.

The diffraction layer may include at least one grating pitch and the grating pitch may be in the range of about 0.8 micrometer (μm) to about 10 μm.

The anisotropic material may include a liquid crystal, the diffraction layer may include a plurality of liquid crystals disposed in the thickness direction, and the plurality of liquid crystals disposed in the thickness direction may not be twisted in the in-plane direction of the diffraction layer.

The anisotropic material has a birefringence dispersion satisfying Relationship Equations 4A and 5A.

$$0.70 \leq \Delta n_1(450 \text{ nm})/\Delta n_1(550 \text{ nm}) \leq 1.00 \quad \text{Relationship Equation 4A}$$

$$1.00 \leq \Delta n_1(650 \text{ nm})/\Delta n_1(550 \text{ nm}) \leq 1.25 \quad \text{Relationship Equation 5A}$$

In Relationship Equations 4A and 5A, $\Delta n_1$ (450 nm) is birefringence of an anisotropic material at a wavelength of 450 nm, $\Delta n_1$ (550 nm) is birefringence of an anisotropic material at a wavelength of 550 nm, and $\Delta n_1$ (650 nm) is birefringence of an anisotropic material at a wavelength of 650 nm.

A birefringence of the anisotropic material at a wavelength of 550 nm may be in the range of about 0.1 to about 0.5.

The diffraction layer may have diffraction angles at a wavelength of 450 nm, a diffraction angle at the wavelength of 550 nm, and a diffraction angle at the wavelength of 650 nm are the same or different and may be within about 1 degree (°) to about 50 degrees of each other.

The diffraction efficiencies of the diffractive optical element at the wavelength of 450 nm, the wavelength of 550 nm, and the wavelength of 650 nm may be independently about 70% to about 100%.

A difference between the greatest diffraction efficiency and the smallest diffraction efficiency among the diffraction efficiencies of the diffractive optical element at the wavelength of 450 nanometers, the wavelength of 550 nanometers, and the wavelength of 650 nanometers, may be less than about 20%.

The diffractive optical element may be a lens or prism.

The diffractive optical element may be a flat diffractive optical element having a constant thickness and a constant curvature.

According to another embodiment, a diffractive optical element includes a plurality of optical axes along the in-plane direction, wherein birefringence for light of longer having a wavelength of 550 nanometers to 650 nanometers is greater than or equal to birefringence of light having a wavelength of 450 nanometers to less than 550 nanometers, and a diffraction efficiency at a wavelength of 450 nm, a wavelength of 550 nm, and a wavelength of 650 nm wavelengths is each independently greater than or equal to about 70% to about 100%.

The diffractive optical element may have a birefringence dispersion satisfying one of Relationship Equations 1B to 3B.

$$\Delta n_2(450 \text{ nm}) < \Delta n_2(550 \text{ nm}) \leq \Delta n_2(650 \text{ nm}) \quad \text{Relationship Equation 1B}$$

$$\Delta n_2(450 \text{ nm}) \leq \Delta n_2(550 \text{ nm}) < \Delta n_2(650 \text{ nm}) \quad \text{Relationship Equation 2B}$$

$$\Delta n_2(450 \text{ nm}) = \Delta n_2(550 \text{ nm}) = \Delta n_2(650 \text{ nm}) \quad \text{Relationship Equation 3B}$$

In Relationship Equations 1B to 3B, $\Delta n_2$ (450 nm) is birefringence of the diffractive optical element at 450 nm wavelength, $\Delta n_2$ (550 nm) is birefringence of the diffractive optical element at 550 nm wavelength, and $\Delta n_2$ (650 nm) is birefringence of the diffractive optical element at 650 nm wavelength.

A difference between the greatest diffraction efficiency and the smallest diffraction efficiency among the diffraction efficiencies at the wavelength of 450 nanometers, the wavelength of 550 nanometers, and the wavelength of 650 nanometers, may be less than about 20%.

According to another embodiment, a stacked diffractive optical element includes a plurality of the diffractive optical elements.

The stacked diffractive optical element may include a blue diffractive optical element exhibiting a greatest diffraction efficiency in a wavelength region of about 400 nm to about 500 nm, a green diffractive optical element exhibiting a greatest diffraction efficiency in a wavelength region of about 500 nm to about 600 nm, and a red diffractive optical element exhibiting a greatest diffraction efficiency in a wavelength region of about 600 nm to about 700 nm.

The stacked diffractive optical element may further include at least wavelength selective filter.

According to another embodiment, a device includes the diffractive optical element or the stacked diffractive optical element.

High diffraction efficiency and wide bandwidth may be realized.

A method of method of manufacturing a stacked diffractive optical element includes:

stacking a plurality of diffractive optical elements, each comprising a diffraction layer comprising a plurality of optical axes along an in-plane direction, wherein each diffraction layer independently comprises an anisotropic material that satisfies one of Relationship Equations 1A to 3A:

$\Delta n_1(450 \text{ nm}) < \Delta n_1(550 \text{ nm}) \leq \Delta n_1(650 \text{ nm})$  Relationship Equation 1A $\Delta n_1(450 \text{ nm}) \leq \Delta n_1(550 \text{ nm}) < \Delta n_1(650 \text{ nm})$  Relationship Equation 2A $\Delta n_1(450 \text{ nm}) = \Delta n_1(550 \text{ nm}) = \Delta n_1(650 \text{ nm})$  Relationship Equation 3A wherein, in Relationship Equations 1A to 3A, $\Delta n_1$ (450 nm) is a birefringence of the anisotropic material at a wavelength of 450 nanometers, $\Delta n_1$ (550 nm) is a birefringence of the anisotropic material at a wavelength of 550 nanometers, and $\Delta n_1$ (650 nm) is a birefringence of the anisotropic material at a wavelength of 650 nanometers.

DETAILED DESCRIPTION

Figure 1A:
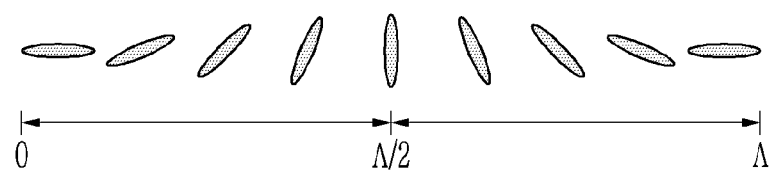
FIG. 1A is a top plan view of a cross-section of an embodiment of a diffractive optical element.

Hereinafter, example embodiments of the present invention will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The terminology used herein is for the purpose of describing particular embodiments only and is not intended to be limiting. As used herein, "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one elements relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a diffractive optical element according to an embodiment is described.

Figure 1B:
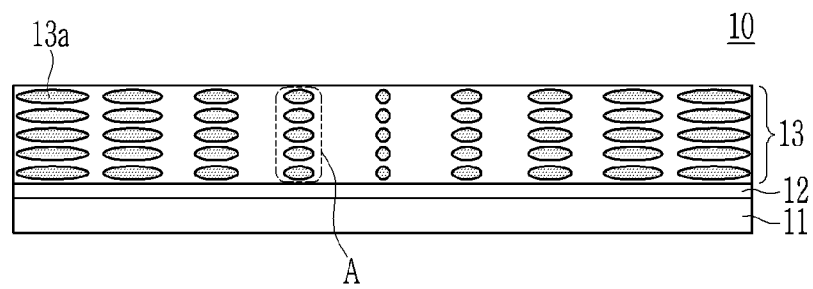
FIG. 1B is a side view of a cross-section of an embodiment of a diffractive optical element.
Figure 2:
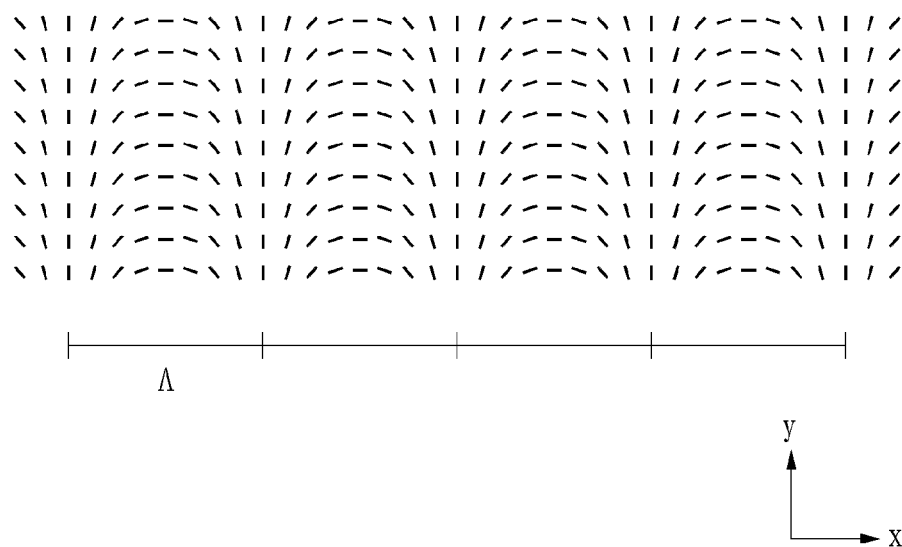
FIG. 2 is a top plan view illustrating an embodiment of an arrangement of a plurality of optical axes of a diffraction layer in a diffractive optical element.
Figure 3:
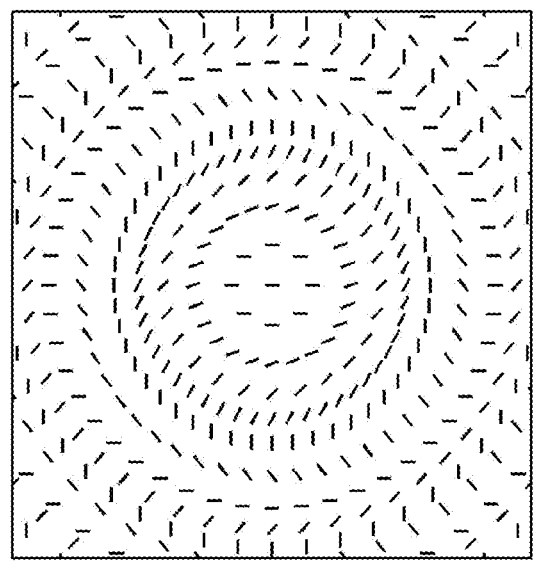
FIG. 3 is a top plan view illustrating another embodiment of an arrangement of a plurality of optical axes of a diffraction layer in a diffractive optical element.
Figure 3:
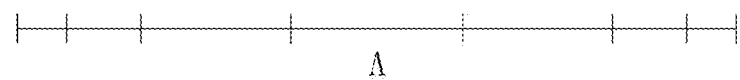
Figure 4:
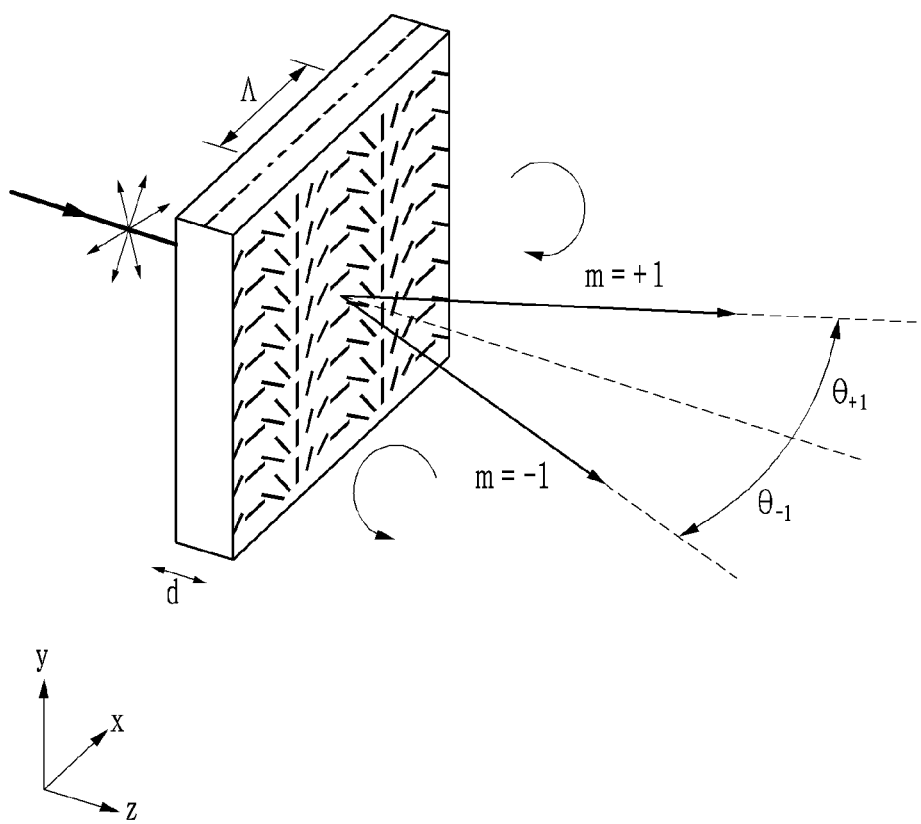
FIG. 4 is a schematic view showing a principle of polarization grating of an embodiment of a diffraction layer in a diffractive optical element.

FIG. 1A is a top plan view and FIG. 1B is a side view of a cross-section of a diffractive optical element according to an embodiment, FIG. 2 is a top plan view illustrating an embodiment of an arrangement of a plurality of optical axes of a diffraction layer in a diffractive optical element, FIG. 3 is a top plan view illustrating another embodiment of an arrangement of a plurality of optical axes of a diffraction layer in a diffractive optical element, and FIG. 4 is a schematic view schematically showing a principle of polarization grating of a diffraction layer in a diffractive optical element according to an embodiment.

Referring to FIGS. 1A and 1B, a diffractive optical element 10 according to an embodiment includes a substrate 11, an alignment layer 12, and a diffraction layer 13.

The substrate 11 may include, for example, an inorganic material or an organic material. The inorganic material may include glass, silicon, or a combination thereof. For example, the substrate may be a silicon wafer. The organic material may include a polycarbonate, a polymethylmethacrylate (PMMA), a polyethylene terephthalate (PET), a polyethylene naphthalate (PEN), a polyvinyl alcohol, a triacetyl cellulose, a polyimide, a polyimide, a polyethersulfone (FES), a copolymer thereof, a derivative thereof, or a combination thereof. The substrate 11 may be omitted.

The alignment layer 12 may control the orientation of the anisotropic material, as is further described below, and may comprise, for example, a polyvinyl alcohol, a polyolefin, a polyamic acid, a polyimide, or a combination thereof. The surface of the alignment layer 12 may impart a predetermined orientation (e.g., a pretilt) capability to the anisotropic material upon application of a physical treatment such as rubbing or a light treatment such as light orientation. The alignment layer 12 may be omitted.

The diffraction layer 13 may be an anisotropic diffraction layer including an anisotropic material capable of changing a direction of a wavelength of light and thus exhibit an extra phase delay, in addition to a phase delay from an anisotropic layer. The diffraction layer 13 may be effective as a polarization grating, and be may be configured to diffract incident light into two circularly polarized lights, e.g., a left polarized light and a right polarized light, which are circularly polarized in directions opposite to each other. The diffraction layer 13 may be a half wave plate.

The diffraction layer 13 may have a plurality of optical axes in an in-plane direction. The plurality of optical axes may be, for example, aligned in a radial shape or in a shape which changes along a clockwise direction or a counterclockwise direction. Orientation angles among adjacent optical axes may be constant, evenly changed, or unevenly changed. A combination of constant and changing orientation angles may also be used.

The plurality of optical axes may be periodically changed, such that the optical axis of the diffraction layer changes along the in-plane direction of the diffraction layer in a periodic manner. For example, the diffraction layer 13 may include at least one grating pitch ($\wedge$) including the plurality of optical axes, and the grating pitch ($\wedge$) may be constant or may change in a periodic manner.

For example, referring to FIG. 2, the diffraction layer 13 may include a plurality of grating pitches ($\wedge$) including the plurality of optical axes, and the plurality of grating pitches ($\wedge$) may be constant. For example, the plurality of grating pitches ($\wedge$) may be constant in a first direction, e.g., a y direction, and disposed as a repeating pattern in a second direction, e.g., an x direction.

For example, referring to FIG. 3, the diffraction layer 13 may include the plurality of grating pitches ($\wedge$) including the plurality of optical axes, and the grating pitches ($\wedge$) may be different from each other. For example, the plurality of grating pitches ($\wedge$) may be disposed as a non-repeating pattern.

The diffraction angle ($\theta$) may vary depending on a grating pitch ($\wedge$), and may be represented by Relationship Equation 1.

$$\sin\theta_m = \left(m\frac{\lambda}{\Lambda}\right) + \sin\theta_{in} \qquad \text{Relationship Equation 1}$$

In Relationship Equation 1,
m is a diffraction order,
$\theta_m$ is a $m^{th}$ diffraction angle,
$\theta_{in}$ is an incident angle of incident light,
$\wedge$ is a grating pitch, and
$\lambda$ is a wavelength of incident light.

For example, in Relationship Equation 1, when the diffraction order (m) is 1 and the incident angle ($\theta_{in}$) of the incident light is 0, the diffraction angle ($\theta$) may be represented by Relationship Equation A.

$$\theta = \sin^{-1}\left(\frac{\lambda}{\Lambda}\right) \qquad \text{Relationship Equation A}$$

In Relationship Equation A,
$\theta$ is a diffraction angle,
$\wedge$ is a grating pitch, and
$\lambda$ is a wavelength of incident light.

For example, the grating pitch ($\wedge$) of the diffraction layer 13 may be greater than the wavelength of the incident light. In an aspect, a plurality of grating pitches may be provided, and at least one grating pitch ($\wedge$) of the plurality of grating pitches may be independently greater than or equal to about 0.8 micrometer (μm). At least one grating pitch ($\wedge$) may be independently greater than or equal to about 0.9 μm, greater than or equal to about 1.0 μm, greater than or equal to about 1.1 μm, greater than or equal to about 1.2 μm, greater than or equal to about 1.5 μm, greater than or equal to about 1.8 μm, or greater than or equal to about 2.0 μm. At least one grating pitch ($\wedge$) may be within the range, about 0.8 μm to about 10 μm, about 1.0 μm to about 10 μm, about 1.1 μm to about 10 μm, about 1.2 μm to about 10 μm, about 1.5 μm to about 10 μm, about 1.8 μm to about 10 μm, or about 2.0 μm to about 10 μm.

For example, the diffraction angle ($\theta$) of the diffraction layer 13 may be the same or different at wavelengths of 450 nm, 550 nm, and 650 nm, and they may be all within about 1 degree to about 50 degrees of one another, respectively. The diffraction angle ($\theta$) of the diffraction layer 13 at wavelengths of 450 nm, 550 nm, and 650 nm may be within about 2 degrees to 50 degrees, 5 degrees or 50 degrees, 10 degrees to about 50 degrees, about 15 degrees to about 50 degrees, about 20 degrees to about 50 degrees, about 5 degrees to about 40 degrees, about 10 degrees to about 40 degrees, about 15 degrees to about 40 degrees, or about 20 degrees to about 40 degrees of each other.

For example, the diffraction layer may have a diffraction angle ($\theta$) at a wavelength of 450 nm which is less than the diffraction angle ($\theta$) at a wavelength of 550 nm and a wavelength of 650 nm, and the diffraction angle ($\theta$) at a wavelength of 550 nm may be less than the diffraction angle ($\theta$) at a wavelength of 650 nm. For example, a difference between the diffraction angles ($\theta$) at a wavelength of 450 nm and the diffraction angle at a wavelength of 550 nm of the diffraction layer 13 may be less than or equal to about 20 degrees, or within the range of about 1 degree to about 20 degrees, about 1 degree to about 15 degrees, or about 1 degree to about 10 degrees. A difference between the diffraction angles (θ) at a wavelength of 550 nm and a wavelength of 650 nm of the diffraction layer 13 may be less than or equal to about 20 degrees, and within the range of about 1 degree to about 20 degrees, about 1 degree to about 15 degrees, or about 1 degree to about 10 degrees.

The diffraction layer 1 includes an anisotropic material 13a. The anisotropic material 13a may be for example a liquid crystal, and for example, the liquid crystal may be a rod-shaped liquid crystal, a disk-shaped liquid crystal, or a combination thereof. The diffraction layer may include a plurality of liquid crystals. The liquid crystal may include a monomer, an oligomer, a polymer, or a combination thereof. For example the liquid crystal may include at least one mesogenic moiety and at least one polymerizable functional group, a cured product thereof, or a combination thereof.

Referring to FIGS. 1A and 1B, the diffraction layer 13 includes a plurality of the anisotropic materials 13a aligned in a thickness direction, and the plurality of the anisotropic materials 13a aligned in the thickness direction may form one section A having the same optical axis. The plurality of the anisotropic materials 13a in one section A is not twisted relative to an in-plane direction of the diffraction layer 13, but instead may be substantially horizontally aligned. For example, the plurality of the anisotropic materials 13a in one section A may be substantially horizontally aligned from the lower surface of the diffraction layer 13 to the upper surface thereof. As used herein, the term "substantially horizontally aligned" means at least 95%, or at least 97%, or at least 99% of the plurality of anisotropic materials of the diffraction layer are horizontally aligned. In an aspect, 100% of the plurality of anisotropic materials are horizontally aligned.

A birefringence of the anisotropic material 13a is a difference between a maximum refractive index and a minimum refractive index of the anisotropic material 13a at a selected wavelength of light. For example, the anisotropic material may have a birefringence of less than or equal to about 0.5, less than or equal to about 0.4, or less than or equal to about 0.3, and may be within the range of about 0.1 to about 0.5, about 0.1 to about 0.4, about 0.1 to about 0.3, or about 0.2 to about 0.4.

The birefringence of the anisotropic material may be the same or different depending on a wavelength of light, and when the birefringence differs depending on a wavelength, the anisotropic material may have birefringence dispersion in which the birefringence increases as the wavelength of light is increased. For example, the birefringence dispersion of the anisotropic material may be compared by determining the birefringence of the anisotropic material at a plurality of wavelengths in a visible wavelength region, for example, at a wavelength of 450 nm, a wavelength of 550 nm, and a wavelength of 650 nm.

For example, the birefringence dispersion of the anisotropic material at wavelengths of 450 nm, 550 nm, and 650 nm may satisfy one of Relationship Equation 1A to 3A.

$$\Delta n_1(450\ nm) < \Delta n_1(550\ nm) \leq \Delta n_1(650\ nm) \quad \text{Relationship Equation 1A}$$

$$\Delta n_1(450\ nm) \leq \Delta n_1(550\ nm) < \Delta n_1(650\ nm) \quad \text{Relationship Equation 2A}$$

$$\Delta n_1(450\ nm) = \Delta n_1(550\ nm) = \Delta n_1(650\ nm) \quad \text{Relationship Equation 3A}$$

In Relationship Equations 1A to 3A, $\Delta n_1$ (450 nm) is birefringence of an anisotropic material at a wavelength of 450 nm wavelength, $\Delta n_1$ (550 nm) is birefringence of an anisotropic material at a wavelength of 550 nm wavelength, and $\Delta n_1$ (650 nm) is birefringence of an anisotropic material at a wavelength of 650 nm wavelength.

The birefringence dispersion of the anisotropic material 13a in a short wavelength region may be represented as a ratio of the birefringence at a wavelength of 450 nm to the birefringence at a wavelength of 550 nm wavelength, and the birefringence dispersion of the anisotropic material 13a in a short wavelength region may satisfy Relationship Equation 4A.

$$0.70 \leq \Delta n_1(450\ nm)/\Delta n_1(550\ nm) \leq 1.00 \quad \text{Relationship Equation 4A}$$

For example, the birefringence dispersion of the anisotropic material 13a in a short wavelength region may satisfy Relationship Equation 4A-1.

$$0.72 \leq \Delta n_1(450\ nm)/\Delta n_1(550\ nm) \leq 0.95 \quad \text{Relationship Equation 4A-1}$$

For example, the birefringence dispersion of the anisotropic material 13a in a short wavelength region may satisfy Relationship Equation 4A-2.

$$0.75 \leq \Delta n_1(450\ nm)/\Delta n_1(550\ nm) \leq 0.95 \quad \text{Relationship Equation 4A-2}$$

For example, the birefringence dispersion of the anisotropic material 13a in a short wavelength region may satisfy Relationship Equation 4A-3.

$$0.80 \leq \Delta n_1(450\ nm)/\Delta n_1(550\ nm) \leq 0.92 \quad \text{Relationship Equation 4A-3}$$

The birefringence dispersion of the anisotropic material 13a in a long wavelength region may be represented as a ratio of the birefringence a at a wavelength of 550 nm to the birefringence at a wavelength of 650 nm, and the birefringence dispersion of the anisotropic material 13a in a long wavelength region may satisfy Relationship Equation 5A.

$$1.00 \leq \Delta n_1(650\ nm)/\Delta n_1(550\ nm) \leq 1.25 \quad \text{Relationship Equation 5A}$$

For example, the birefringence dispersion of the anisotropic material 13a in a long wavelength region may satisfy Relationship Equation 5A-1.

$$1.05 \leq \Delta n_1(650\ nm)/\Delta n_1(550\ nm) \leq 1.25 \quad \text{Relationship Equation 5A-1}$$

For example, the birefringence dispersion of the anisotropic material 13a in a long wavelength region may satisfy Relationship Equation 5A-2.

$$1.07 \leq \Delta n_1(650\ nm)/\Delta n_1(550\ nm) \leq 1.20 \quad \text{Relationship Equation 5A-2}$$

For example, the birefringence dispersion of the anisotropic material 13a in a long wavelength region may satisfy Relationship Equation 5A-3.

$$1.08 \leq \Delta n_1(650\ nm)/\Delta n_1(550\ nm) \leq 1.19 \quad \text{Relationship Equation 5A-3}$$

The birefringence of the diffractive optical element 10 may be the same as the birefringence of the diffraction layer 13, and the birefringence of the diffraction layer 13 may be represented as a difference between a refractive index at an optical axis having the largest in-plane refractive index of the diffraction layer 13 and a refractive index at an optical axis having the smallest in-plane refractive index of the diffraction layer 13. For example, the birefringence of the diffractive optical element 10 (or the birefringence of the diffraction layer 13) may be less than or equal to about 0.5, less than or equal to about 0.4, or less than or equal to about 0.3, and may be within the range, about 0.1 to about 0.5, about 0.1 to about 0.4, about 0.1 to about 0.3, or about 0.2 to about 0.4.

The birefringence of the diffractive optical element 10 (or the birefringence of the diffraction layer 13) may be the same or different depending on the wavelength of light. If the birefringence varies depending on the wavelength of light, it may have a birefringence dispersion in which the birefringence increases as the wavelength increases. For example, the birefringence of the diffractive optical element 10 (or the birefringence of the diffraction layer 13) may be determined by comparing the birefringences measured at a plurality of wavelengths in the visible wavelength region, for example the birefringence at wavelengths of 450 nm, 550 nm, and 650 nm.

For example, the birefringence dispersion at wavelengths of 450 nm, 550 nm, and 650 nm of the diffractive optical element 10 (or the diffraction layer 13) may satisfy one of Relationship Equations 1B to 3B.

$\Delta n_2$(450 nm)<$\Delta n_2$(550 nm)≤$\Delta n_2$(650 nm)  Relationship Equation 1B $\Delta n_2$(450 nm)≤$\Delta n_2$(550 nm)<$\Delta n_2$(650 nm)  Relationship Equation 2B $\Delta n_2$(450 nm)=$\Delta n_2$(550 nm)=$\Delta n_2$(650 nm)  Relationship Equation 3B In Relationship Equations 1B to 3B,
$\Delta n_2$ (450 nm) is birefringence of a diffractive optical element (or diffraction layer) at a wavelength of 450 nm,
$\Delta n_2$ (550 nm) is birefringence of a diffractive optical element (or diffraction layer) at a wavelength of 550 nm, and
$\Delta n_2$ (650 nm) is birefringence of a diffractive optical element (or diffraction layer) at a wavelength of 650 nm.

The birefringence dispersion of the diffractive optical element 10 (or the diffraction layer 13) in a short wavelength region may be represented as a ratio of birefringence in 450 nm and 550 nm wavelengths, and the birefringence dispersion of the diffractive optical element 10 (or the diffraction layer 13) in a short wavelength region may satisfy Relationship Equation 4B.

0.70≤$\Delta n_2$(450 nm)/$\Delta n_2$(550 nm)≤1.00  Relationship Equation 4B

For example, the birefringence dispersion of the diffractive optical element 10 (or the diffraction layer 13) in a short wavelength region may satisfy Relationship Equation 4B-1.

0.72≤$\Delta n_2$(450 nm)/$\Delta n_2$(550 nm)≤0.95  Relationship Equation 4B-1

For example, the birefringence dispersion of the diffractive optical element 10 (or the diffraction layer 13) in a short wavelength region may satisfy Relationship Equation 4B-2.

0.75≤$\Delta n_2$(450 nm)/$\Delta n_2$(550 nm)≤0.95  Relationship Equation 4B-2

For example, the birefringence dispersion of the diffractive optical element 10 (or the diffraction layer 13) in a short wavelength region may satisfy Relationship Equation 4B-3.

0.80≤$\Delta n_2$(450 nm)/$\Delta n_2$(550 nm)≤0.92  Relationship Equation 4B-3

The birefringence dispersion of the diffractive optical element 10 (or the diffraction layer 13) in a long wavelength region may be represented as a ratio of birefringence in 550 nm and 650 nm wavelengths, and the birefringence dispersion of the diffractive optical element 10 (or the diffraction layer 13) in a long wavelength region may satisfy Relationship Equation 5B.

1.00≤$\Delta n_2$(650 nm)/$\Delta n_2$(550 nm)≤1.25  Relationship Equation 5B

For example, the birefringence dispersion of the optical element 10 (or the diffraction layer 13) in a long wavelength region may satisfy Relationship Equation 5B-1.

1.05≤$\Delta n_2$(650 nm)/$\Delta n_2$(550 nm)≤1.25  Relationship Equation 5B-1

For example, the birefringence dispersion of the optical element 10 (or the diffraction layer 13) in a long wavelength region may satisfy Relationship Equation 5B-2.

1.07≤$\Delta n_2$(650 nm)/$\Delta n_2$(550 nm)≤1.20  Relationship Equation 5B-2

For example, the birefringence dispersion of the optical element 10 (or the diffraction layer 13) in a long wavelength region may satisfy Relationship Equation 5B-3.

1.08≤$\Delta n_2$(650 nm)/$\Delta n_2$(550 nm)≤1.9  Relationship Equation 5B-3

By including the anisotropic material 13a and/or the diffraction layer 13 satisfying the aforementioned birefringence dispersion characteristics, the diffraction efficiency in the visible region of the diffractive optical element 10 may be improved.

The diffraction efficiency may be for example represented as Relationship Equation 2.

$$\eta_{\pm 1} = \frac{1 \mp S_3'}{2} \sin^2\left(\frac{\pi \Delta n d}{\lambda}\right) \quad \text{Relationship Equation 2}$$

In Relationship Equation 2,
$\eta_{\pm 1}$ is diffraction efficiency in the right and left polarization of the diffractive optical element,
$\lambda$ is a wavelength of incident light,
$\Delta n$ is birefringence of an anisotropic material at $\lambda$ wavelength,
d is a thickness of a diffraction layer, and
$S_3'$ is a normalized Stokes parameter, and may be +1 (left polarization) or −1 (right polarization).

For example, the diffraction efficiency of the diffractive optical element at a wavelength of 450 nm may be a first diffraction efficiency, the diffraction efficiency of the diffractive optical element at a wavelength of 550 nm may be a second diffraction efficiency, and the diffraction efficiency of the diffractive optical element at a wavelength of 450 nm is a first diffraction efficiency, and the diffraction efficiency of the diffractive optical element at a wavelength of 650 nm may be a third diffraction efficiency. Each of the first diffraction efficiency, the second diffraction efficiency, and the third diffraction efficiency may be independently greater than or equal to about 70%. Each of the first diffraction efficiency, second diffraction efficiency, and third diffraction efficiency may be greater than or equal to about 75%, greater than or equal to about 80%, greater than or equal to about 85%, greater than or equal to about 90%, or greater than or equal to about 95%, respectively. In embodiments, each of the first diffraction efficiency, second diffraction efficiency, and third diffraction efficiency may be about 70% to about 100%, or about 75% to about 100%, or about 85% to about 100% or about 95% to about 100%, or about 98% to about 100%.

For example, a difference between the greatest diffraction efficiency and the smallest diffraction efficiency among the first diffraction efficiency, second diffraction efficiency, and third diffraction efficiency may be less than about 20%, within the range, less than or equal to about 18%, less than or equal to about 16%, less than or equal to about 15%, less than or equal to about 12%, less than or equal to about 10%, less than or equal to about 8%, less than or equal to about 5%, less than or equal to about 3%, less than or equal to about 2%, or less than or equal to about 1%. For example, the difference between the greatest diffraction efficiency and the smallest diffraction efficiency among the first diffraction efficiency, second diffraction efficiency, and third diffraction efficiency may be between 0 and about 20%, between about 0.01 and about 20%, between about 0.05 and about 20%, between about 0.1 and about 20%, between about 0.2 and about 20%, between about 0.3 and about 20%, between about 0.4 and about 20% or between about 0.5 and about 20%, or between about 0.5 and about 15%, or between about 0.5% and about 10%.

In addition, the diffractive optical element may improve a bandwidth in the visible region of the diffractive optical element by including the anisotropic material satisfying the aforementioned birefringence dispersion. The bandwidth may be a width of a light wavelength region that satisfies a predetermined diffraction efficiency, for example, a width of a light wavelength region satisfying a predetermined diffraction efficiency in a visible wavelength region.

For example, the bandwidth of the diffractive optical element 10 that satisfies a diffraction efficiency of greater than or equal to about 70% in a wavelength region of about 400 nm to about 700 nm may be greater than or equal to about 180 nm. The bandwidth of the diffractive optical element 10 that satisfies a diffraction efficiency of greater than or equal to about 70% in a wavelength region of about 400 nm to about 700 nm may be greater than or equal to about 190 nm, greater than or equal to about 200 nm, greater than or equal to about 210 nm, or greater than or equal to about 220 nm, within the range about 180 nm to about 300 nm, about 190 nm to about 300 nm, about 200 nm to about 300 nm, about 210 nm to about 300 nm, or about 220 nm to about 300 nm.

For example, the bandwidth of the diffractive optical element 10 that satisfies a diffraction efficiency of greater than or equal to about 80% in a wavelength region of about 400 nm to about 700 nm may be greater than or equal to about 180 nm. The bandwidth of the diffractive optical element 10 that satisfies a diffraction efficiency of greater than or equal to about 80% in a wavelength region of about 400 nm to about 700 nm may be greater than or equal to about 190 nm, greater than or equal to about 200 nm, greater than or equal to about 210 nm, or greater than or equal to about 220 nm, and may be within the range about 180 nm to about 300 nm, about 190 nm to about 300 nm, about 200 nm to about 300 nm, about 210 nm to about 300 nm, or about 220 nm to about 300 nm.

For example, the bandwidth of the diffractive optical element 10 that satisfies diffraction efficiency of greater than or equal to about 90% in a wavelength region of about 400 nm to about 700 nm may be greater than or equal to about 180 nm. The bandwidth of the diffractive optical element 10 that satisfies diffraction efficiency of greater than or equal to about 90% in a wavelength region of about 400 nm to about 700 nm may be greater than or equal to about 190 nm, greater than or equal to about 200 nm, greater than or equal to about 210 nm, or greater than or equal to about 220 nm, and may be within the range about 180 nm to about 300 nm, about 190 nm to about 300 nm, about 200 nm to about 300 nm, about 210 nm to about 300 nm, or about 220 nm to about 300 nm.

As described above, the diffractive optical element 10 according to embodiments may implement a high performance diffractive optical element by having an excellent diffraction efficiency and a wide bandwidth. In addition, in embodiments, the diffractive optical element 10 may be easily designed to have a grating pitch and a thickness by forming the diffraction layer 13 using an anisotropic material such as a liquid crystal and thus may be effectively applied to a large area diffractive optical element.

The diffractive optical element according to embodiments may be, for example, a lens or a prism. The diffractive optical element according to embodiments may be a flat diffractive optical element such as a flat lens or a flat prism having a constant thickness and constant curvature and may perform both a functions of a concave lens and a convex lens having various focal distances, without changing the shape and/or curvature of the diffractive optical element, but rather, by adjusting the aforementioned grating pitch and diffraction angle of the diffraction layer.

The aforementioned diffractive optical element may be used as a stacked diffractive optical element including a plurality of diffractive optical elements configured to selectively diffract light of different wavelengths.

The stacked diffractive optical element may be manufactured by stacking a plurality of diffractive optical elements, each including a diffraction layer comprising a plurality of optical axes along an in-plane direction. The diffraction layer of each diffractive optical element independently includes an anisotropic material that satisfies one of Relationship Equations 1A to 3A, described above.

FIGS. 5 and 6A-6C are schematic views of stacked diffractive optical elements according to embodiments.

For example, the stacked diffractive optical element 100 may include a blue diffractive optical element 100B exhibiting a greatest diffraction efficiency in wavelength region of greater than or equal to about 400 nm and less than about 500 nm, a green diffractive optical element 100G exhibiting a greatest diffraction efficiency in wavelength region of about 500 nm to about 600 nm, and a red diffractive optical element 100R exhibiting a greatest diffraction efficiency in wavelength region of greater than about 600 nm and less than or equal to about 700 nm. The blue diffractive optical element 100B may include at least one of the aforementioned diffractive optical element 10, the green diffractive optical element 100G may include at least one of the aforementioned diffractive optical element 10, and the red diffractive optical element 100R may include at least one of the aforementioned diffractive optical element 10.

For example, the stacked diffractive optical element 100 may have diffraction angles (θ) at wavelengths of 450 nm, 550 nm, and 650 nm which may be within about 1 degree to 50 degrees of each other, and may be within the range, about 2 degrees to about 50 degrees, about 5 degrees to about 50 degrees, about 10 degrees to about 50 degrees, about 15 degrees to about 50 degrees, about 20 degrees to about 50 degrees, or about 20 degrees to about 40 degrees.

For example, the grating pitches (∧) at the wavelengths of 450 nm, 550 nm, and 650 nm of the stacked diffractive optical element 100 may be different from one another. For example, the grating pitch (∧) at a wavelength of 450 nm may be less than the grating pitch (∧) at a wavelength of 550 nm, and the grating pitch (∧) at a wavelength of 550 nm may be less than the grating pitch (∧) at a wavelength of 650 nm.

For example, the blue diffractive optical element 100B, the green diffractive optical element 100G, and the red diffractive optical element 100R may include two of the aforementioned diffractive optical elements 10 and a wavelength selective filter 20B, 20G, 20R disposed therebetween, respectively.

Figure 6A:
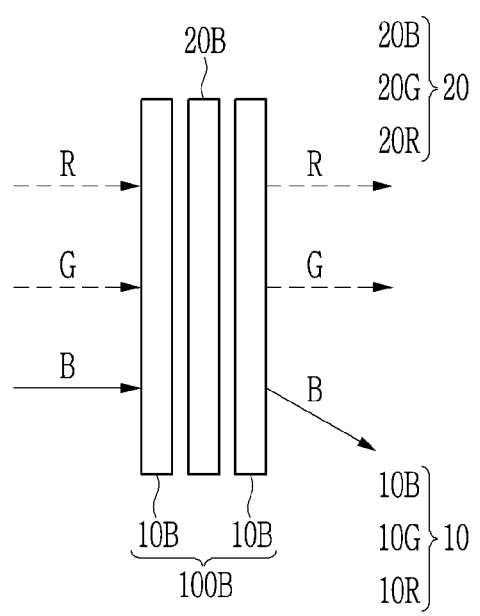
FIGS. 6A, 6B, and 6C are schematic views of an embodiment of stacked diffraction optical elements including blue (FIG. 6A), green (FIG. 6), or red (FIG. 6C) selective filters.
Figure 6B:
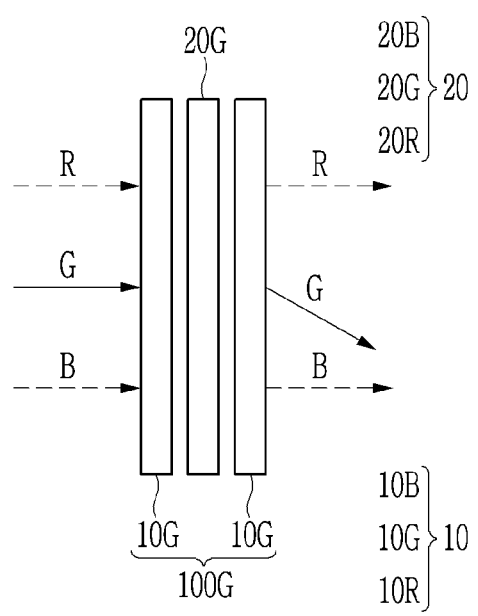
Figure 6C:
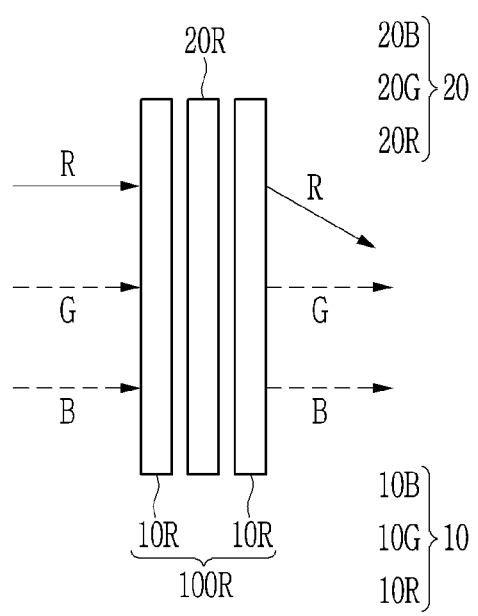

Referring to FIG. 6A, the blue diffractive optical element 100E may include a two diffractive optical elements 10B and a blue wavelength selective filter 20B disposed therebetween. Referring to FIG. 6B the green diffractive optical element 100G may include two diffractive optical elements 10G and a green wavelength selective filter 20G disposed therebetween. Referring to FIG. 6C the red diffractive optical element 100R may include two diffractive optical elements 10R and a red wavelength selective filter 20R disposed therebetween. The blue wavelength selective filter 20B included in the blue diffractive optical element 100B may exhibit half waveplate characteristics in a blue wavelength region such as about 450 nm wavelength; the green wavelength selective filter 20G included in the green diffractive optical element 10G may exhibit half waveplate characteristics in a green wavelength region such as about 550 nm wavelength; and the red wavelength selective filter 20R included in the red diffractive optical element 10R may exhibit half waveplate characteristics in a red wavelength region such as about 650 nm wavelength.

The diffraction efficiency and bandwidth of the stacked diffractive optical elements may be further improved by combining a plurality of diffractive optical elements suitable for each wavelength region.

The aforementioned diffractive optical element and stacked diffractive optical element may be included in various devices benefitting from improved diffraction characteristics, for example an optical device, an augmented reality (AR) device, a virtual reality (VR) device, or a holographic device.

Hereinafter, the embodiments are illustrated in more detail with reference to examples. However, these examples are exemplary, and the present scope is not limited thereto.

EXAMPLES

Design of Diffractive Optical Element I (1) Design of Anisotropic Material

Figure 7:
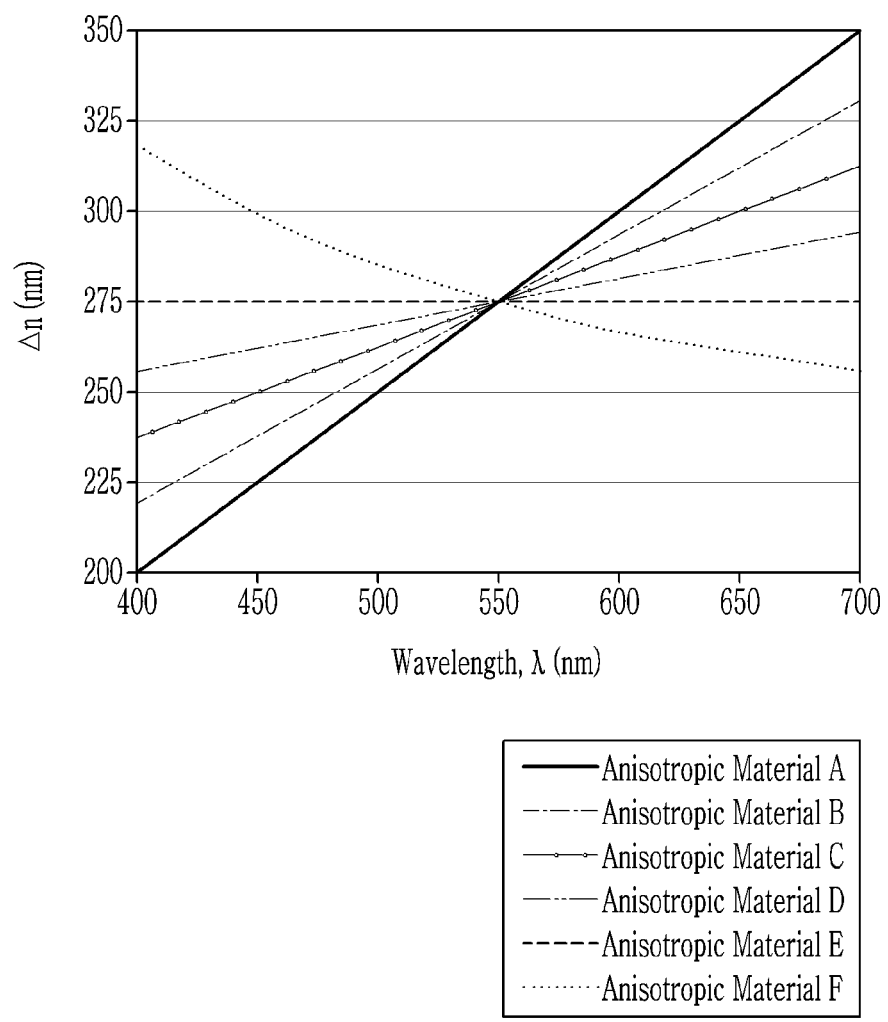
FIG. 7 is a graph of birefringence ($\Delta n$, nm) versus wavelength ($\lambda$, nm), showing birefringence depending on the wavelength of an anisotropic material in a simulation.

Based on properties of the anisotropic materials (liquid crystal) shown in Table 1 and FIG. 7, a diffractive optical element having a configuration shown in FIG. 1 are set.

FIG. 7 is a graph showing the birefringence depending on the wavelength of the anisotropic materials used for the simulation.

TABLE 1

| Anisotropic material | $\Delta n_1$ (450 nm) | $\Delta n_1$ (550 nm) | $\Delta n_1$ (650 nm) | $\Delta n_1$ (450 nm)/ $\Delta n_1$ (550 nm) | $\Delta n_1$ (650 nm)/ $\Delta n_1$ (550 nm) |
|---|---|---|---|---|---|
| A | 0.164 | 0.200 | 0.236 | 0.818 | 1.182 |
| B | 0.173 | 0.200 | 0.227 | 0.864 | 1.136 |
| C | 0.182 | 0.200 | 0.218 | 0.909 | 1.091 |
| D | 0.191 | 0.200 | 0.209 | 0.955 | 1.046 |
| E | 0.200 | 0.200 | 0.200 | 1.000 | 1.000 |
| F | 0.218 | 0.200 | 0.190 | 1.088 | 0.949 |

(2) Other Design Aspects

Average refractive indexes of the anisotropic materials and the birefringence, diffraction angle, and grating pitch of the diffraction layers are designed within the following ranges.

Average refractive index: 1.58
Birefringence: 0.1 to 0.4
Diffraction angle (θ): 5 degrees to 40 degrees
Grating pitch (∧): the grating pitch that satisfies the diffraction angle from Relationship Equation 1 is calculated (0.86 µm to 6.31 µm)
Thickness: thickness is set to be a λ/2 wavelength plate at 550 nm wavelength Simulation I The FDTD software (finite-difference time domain, Lumerical Inc.) is used to perform an optical simulation of a diffractive optical element designed under the above-mentioned conditions.

The results are shown in Tables 2 to 7.

TABLE 2

| Anisotropic material | Example No. | Birefringence ($\Delta n$) | Diffraction angle (θ, degree) | Grating pitch (∧, µm) | Diffraction efficiency ($\eta_{+1}$, %) 450 nm | 550 nm | 650 nm | Diffraction Angles (θ, degrees) 450 nm | 550 nm | 650 nm |
|---|---|---|---|---|---|---|---|---|---|---|
| A | 1 | 0.1 | 5 | 6.31 | 99.96 | 99.99 | 99.91 | 4.1 | 5.0 | 5.9 |
|   | 2 |     | 10 | 3.17 | 99.37 | 99.26 | 98.64 | 8.2 | 10.0 | 11.8 |
|   | 3 |     | 15 | 2.13 | 96.84 | 95.73 | 93.11 | 12.2 | 15.0 | 17.8 |
|   | 4 |     | 20 | 1.61 | 90.20 | 86.14 | 78.75 | 16.2 | 20.0 | 23.8 |
|   | 5 | 0.2 | 5 | 6.31 | 99.99 | 99.95 | 99.99 | 4.1 | 5.0 | 5.9 |
|   | 6 |     | 10 | 3.17 | 99.92 | 99.93 | 99.86 | 8.2 | 10.0 | 11.8 |
|   | 7 |     | 15 | 2.13 | 99.39 | 99.26 | 98.66 | 12.2 | 15.0 | 17.8 |
|   | 8 |     | 20 | 1.61 | 97.77 | 97.01 | 94.92 | 16.2 | 20.0 | 23.8 |
|   | 9 |     | 30 | 1.10 | 88.43 | 83.35 | 72.44 | 24.1 | 30.0 | 36.2 |
|   | 10 | 0.3 | 5 | 6.31 | 99.97 | 99.87 | 99.98 | 4.1 | 5.0 | 5.9 |
|   | 11 |     | 10 | 3.17 | 99.92 | 99.82 | 99.85 | 8.2 | 10.0 | 11.8 |
|   | 12 |     | 15 | 2.13 | 99.62 | 99.42 | 99.16 | 12.2 | 15.0 | 17.8 |
|   | 13 |     | 20 | 1.61 | 97.77 | 98.28 | 97.17 | 16.2 | 20.0 | 23.8 |
|   | 14 |     | 30 | 1.10 | 94.11 | 91.50 | 85.36 | 24.1 | 30.0 | 36.2 |
|   | 15 | 0.4 | 5 | 6.31 | 99.82 | 99.62 | 99.84 | 4.1 | 5.0 | 5.9 |
|   | 16 |     | 10 | 3.17 | 99.92 | 99.82 | 99.82 | 8.2 | 10.0 | 11.8 |
|   | 17 |     | 15 | 2.13 | 99.99 | 99.93 | 99.41 | 12.2 | 15.0 | 17.8 |
|   | 18 |     | 20 | 1.61 | 99.84 | 99.71 | 98.28 | 16.2 | 20.0 | 23.8 |
|   | 19 |     | 30 | 1.10 | 98.01 | 96.95 | 91.40 | 24.1 | 30.0 | 36.2 |
|   | 20 |     | 40 | 0.86 | 92.71 | 87.81 | 76.85 | 31.5 | 39.7 | 48.9 |

TABLE 3

| Anisotropic material | Example Nos. | Birefringence (Δn) | Diffraction angle (θ, degree) | Grating pitch (Λ, μm) | Diffraction efficiency (η+1, %) 450 nm | 550 nm | 650 nm | Diffraction Angles (θ, degrees) 450 nm | 550 nm | 650 nm |
|---|---|---|---|---|---|---|---|---|---|---|
| B | 21 | 0.1 | 5 | 6.31 | 99.15 | 99.99 | 99.34 | 4.1 | 5.0 | 5.9 |
|  | 22 |  | 15 | 2.13 | 95.85 | 95.72 | 92.97 | 12.2 | 15.0 | 17.8 |
|  | 23 | 0.2 | 5 | 6.31 | 99.34 | 99.95 | 99.67 | 4.1 | 5.0 | 5.9 |
|  | 24 |  | 15 | 2.13 | 98.77 | 99.26 | 98.21 | 12.2 | 15.0 | 17.8 |
|  | 25 |  | 30 | 1.10 | 87.60 | 83.35 | 72.47 | 24.1 | 30.0 | 36.2 |
|  | 26 | 0.3 | 5 | 6.31 | 99.32 | 99.87 | 99.40 | 4.1 | 5.0 | 5.9 |
|  | 37 |  | 15 | 2.13 | 98.86 | 99.42 | 98.58 | 12.2 | 15.0 | 17.8 |
|  | 28 |  | 30 | 1.10 | 93.09 | 91.51 | 85.25 | 24.1 | 30.0 | 36.2 |
|  | 29 | 0.4 | 5 | 6.31 | 99.53 | 99.62 | 98.84 | 4.1 | 5.0 | 5.9 |
|  | 30 |  | 15 | 2.13 | 99.54 | 99.93 | 98.57 | 12.2 | 15.0 | 17.8 |
|  | 31 |  | 30 | 1.10 | 97.48 | 96.94 | 90.97 | 24.1 | 30.0 | 36.2 |
|  | 32 |  | 40 | 0.86 | 92.19 | 87.78 | 77.04 | 31.5 | 39.7 | 48.9 |

TABLE 4

| Anisotropic material | Example Nos. | Birefringence (Δn) | Diffraction angle (θ, degree) | Grating pitch (Λ, μm) | Diffraction efficiency (η+1, %) 450 nm | 550 nm | 650 nm | Diffraction Angles (θ, degrees) 450 nm | 550 nm | 650 nm |
|---|---|---|---|---|---|---|---|---|---|---|
| C | 33 | 0.1 | 5 | 6.31 | 96.59 | 99.99 | 97.91 | 4.1 | 5.0 | 5.9 |
|  | 34 |  | 15 | 2.13 | 93.19 | 95.73 | 92.00 | 12.2 | 15.0 | 17.8 |
|  | 35 | 0.2 | 5 | 6.31 | 97.44 | 99.95 | 98.70 | 4.1 | 5.0 | 5.9 |
|  | 36 |  | 15 | 2.13 | 96.75 | 99.26 | 97.01 | 12.2 | 15.0 | 17.8 |
|  | 37 |  | 30 | 1.10 | 85.30 | 83.35 | 71.80 | 24.1 | 30.0 | 36.2 |
|  | 38 | 0.3 | 5 | 6.31 | 96.98 | 99.87 | 97.94 | 4.1 | 5.0 | 5.9 |
|  | 39 |  | 15 | 2.13 | 96.29 | 99.42 | 97.05 | 12.2 | 15.0 | 17.8 |
|  | 40 |  | 30 | 1.10 | 90.16 | 91.50 | 84.27 | 24.1 | 30.0 | 36.2 |
|  | 41 | 0.4 | 5 | 6.31 | 98.15 | 99.62 | 96.96 | 4.1 | 5.0 | 5.9 |
|  | 42 |  | 15 | 2.13 | 97.94 | 99.93 | 96.79 | 12.2 | 15.0 | 17.8 |
|  | 43 |  | 30 | 1.10 | 95.67 | 96.95 | 89.66 | 24.1 | 29.9 | 36.0 |
|  | 44 |  | 40 | 0.86 | 90.27 | 87.81 | 76.47 | 31.5 | 39.7 | 48.9 |

TABLE 5

| Anisotropic material | Example Nos. | Birefringence (Δn) | Diffraction angle (θ, degree) | Grating pitch (Λ, μm) | Diffraction efficiency (η+1, %) 450 nm | 550 nm | 650 nm | Diffraction angle (θ, degree) 450 nm | 550 nm | 650 nm |
|---|---|---|---|---|---|---|---|---|---|---|
| D | 45 | 0.1 | 5 | 6.31 | 92.40 | 99.99 | 95.65 | 4.1 | 5.0 | 5.9 |
|  | 46 |  | 15 | 2.13 | 88.88 | 95.73 | 90.22 | 12.2 | 15.0 | 17.8 |
|  | 47 | 0.2 | 5 | 6.31 | 94.39 | 99.95 | 97.07 | 4.1 | 5.0 | 5.9 |
|  | 48 |  | 15 | 2.13 | 93.43 | 99.26 | 95.05 | 12.2 | 15.0 | 17.8 |
|  | 49 |  | 30 | 1.10 | 81.58 | 83.35 | 70.43 | 24.1 | 30.0 | 36.2 |
|  | 50 | 0.3 | 5 | 6.31 | 93.14 | 99.87 | 95.63 | 4.1 | 5.0 | 5.9 |
|  | 51 |  | 15 | 2.13 | 92.02 | 99.42 | 94.62 | 12.2 | 15.0 | 17.8 |
|  | 52 |  | 30 | 1.10 | 85.60 | 91.51 | 82.43 | 24.1 | 30.0 | 36.2 |
|  | 53 | 0.4 | 5 | 6.31 | 95.71 | 99.62 | 94.29 | 4.1 | 5.0 | 5.9 |
|  | 54 |  | 15 | 2.13 | 95.22 | 99.93 | 94.18 | 12.2 | 15.0 | 17.8 |
|  | 55 |  | 30 | 1.10 | 92.63 | 96.94 | 87.53 | 24.1 | 30.0 | 36.2 |
|  | 56 |  | 40 | 0.86 | 87.09 | 87.78 | 75.13 | 31.5 | 39.7 | 48.9 |

TABLE 6

| Anisotropic material | Example Nos. | Birefringence (Δn) | Diffraction angle (θ, degree) | Grating pitch (Λ, μm) | Diffraction efficiency (η+1, %) 450 nm | 550 nm | 650 nm | Diffraction angle (θ, degree) 450 nm | 550 nm | 650 nm |
|---|---|---|---|---|---|---|---|---|---|---|
| E | 57 | 0.1 | 5 | 6.31 | 86.77 | 99.99 | 92.62 | 4.1 | 5.0 | 5.9 |
|  | 58 |  | 15 | 2.13 | 83.15 | 95.73 | 87.76 | 12.2 | 15.0 | 17.8 |

TABLE 6-continued

| Anisotropic material | Example Nos. | Birefringence (Δn) | Diffraction angle (θ, degree) | Grating pitch (Λ, μm) | Diffraction efficiency ($\eta_{+1}$, %) | | | Diffraction angle (θ, degree) | | |
|---|---|---|---|---|---|---|---|---|---|---|
| | | | | | 450 nm | 550 nm | 650 nm | 450 nm | 550 nm | 650 nm |
| | 59 | 0.2 | 5 | 6.31 | 90.25 | 99.95 | 94.77 | 4.1 | 5.0 | 5.9 |
| | 60 | | 15 | 2.13 | 88.99 | 99.26 | 92.36 | 12.2 | 15.0 | 17.8 |
| | 61 | 0.3 | 5 | 6.31 | 88.02 | 99.87 | 92.52 | 4.1 | 5.0 | 5.9 |
| | 62 | | 15 | 2.13 | 86.49 | 99.42 | 91.34 | 12.2 | 15.0 | 17.8 |
| | 63 | | 30 | 1.10 | 79.57 | 91.50 | 79.85 | 24.1 | 30.0 | 36.2 |
| | 64 | 0.4 | 5 | 6.31 | 92.21 | 99.62 | 90.80 | 4.1 | 5.0 | 5.9 |
| | 65 | | 15 | 2.13 | 91.44 | 99.93 | 90.79 | 12.2 | 15.0 | 17.8 |
| | 66 | | 30 | 1.10 | 88.48 | 96.95 | 84.67 | 24.1 | 30.0 | 36.2 |
| | 67 | | 40 | 0.86 | 82.77 | 87.81 | 73.14 | 31.5 | 39.7 | 48.9 |

TABLE 7

| Anisotropic material | Comparative Example Nos. | Birefringence (Δn) | Diffraction angle (θ, degree) | Grating pitch (Λ, μm) | Diffraction efficiency ($\eta_{+1}$, %) | | | Diffraction angle (θ, degree) | | |
|---|---|---|---|---|---|---|---|---|---|---|
| | | | | | 450 nm | 550 nm | 650 nm | 450 nm | 550 nm | 650 nm |
| F | 1 | 0.1 | 5 | 6.31 | 72.67 | 99.99 | 88.40 | 4.1 | 5.0 | 5.9 |
| | 2 | | 15 | 2.13 | 68.93 | 95.73 | 84.20 | 12.2 | 15.0 | 17.8 |
| | 3 | | 30 | 1.10 | 38.77 | 42.99 | 29.33 | 24.1 | 29.9 | 36.0 |
| | 4 | | 40 | 0.86 | 11.02 | 5.20 | 1.83 | 31.2 | 39.0 | 47.2 |
| | 5 | 0.2 | 5 | 6.31 | 79.60 | 99.95 | 91.44 | 4.1 | 5.0 | 5.9 |
| | 6 | | 15 | 2.13 | 77.60 | 99.26 | 88.53 | 12.2 | 15.0 | 17.8 |
| | 7 | | 30 | 1.10 | 64.39 | 83.35 | 65.25 | 24.1 | 30.0 | 36.2 |
| | 8 | | 40 | 0.86 | 44.26 | 54.92 | 34.28 | 31.5 | 39.6 | 48.8 |
| | 9 | 0.3 | 5 | 6.31 | 75.33 | 99.87 | 88.13 | 4.1 | 5.0 | 5.9 |
| | 10 | | 10 | 2.13 | 72.93 | 99.42 | 86.80 | 12.2 | 15.0 | 17.8 |
| | 11 | | 30 | 1.10 | 65.36 | 91.50 | 76.21 | 24.1 | 30.0 | 36.2 |
| | 12 | | 40 | 0.86 | 54.64 | 76.26 | 58.69 | 31.5 | 39.7 | 48.9 |
| | 13 | 0.4 | 5 | 6.31 | 82.52 | 99.62 | 86.22 | 4.1 | 5.0 | 5.9 |
| | 14 | | 10 | 2.13 | 81.17 | 99.93 | 86.28 | 12.2 | 15.0 | 17.8 |
| | 15 | | 30 | 1.10 | 77.59 | 96.95 | 80.79 | 24.1 | 30.0 | 36.2 |
| | 16 | | 40 | 0.86 | 71.78 | 87.81 | 70.20 | 31.5 | 39.7 | 48.9 |

Referring to Tables 2 to 7 above, the diffractive optical elements according to Examples (Tables 2 to 6) demonstrate increased diffraction efficiency under the same conditions as compared with the diffractive optical elements according to the Comparative Examples (Table 7).

Figure 8:
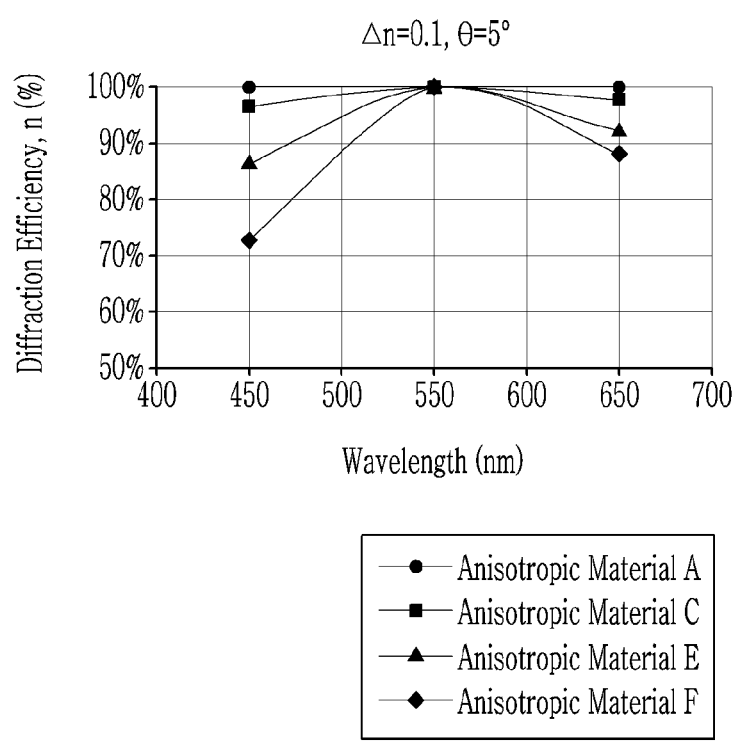
FIGS. 8 to 10 are each a graph of diffraction efficiency (n, %) versus wavelength (nm), showing the diffraction efficiencies depending on the wavelength of the diffractive optical elements in accordance with the Examples and Comparative Examples.
Figure 9:
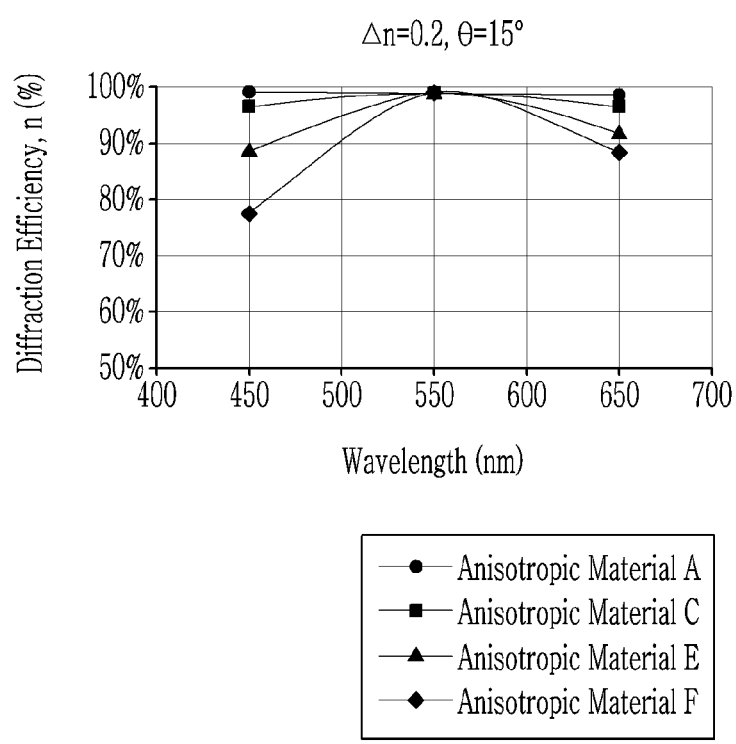
Figure 10:
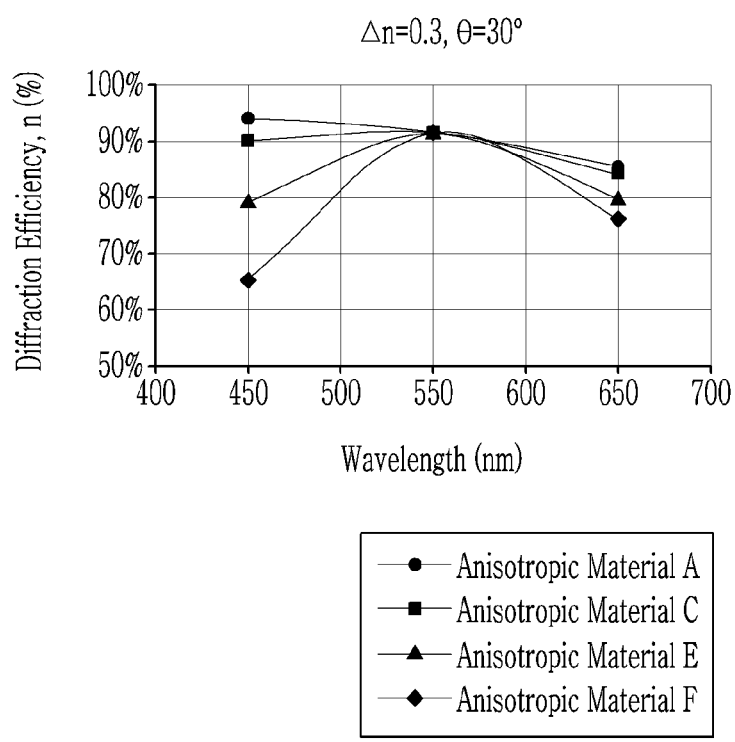

FIGS. 8 to 10 are graphs showing the diffraction efficiency depending on the wavelength of the diffractive optical elements according to Examples and Comparative Examples.

Referring to FIGS. 8 to 10, it is confirmed that the diffractive optical elements according to Examples (Anisotropic materials A-E) have smaller changes in diffraction efficiency across the various wavelengths and under the same conditions as compared with the diffractive optical elements according to the Comparative Examples (Anisotropic material F), for example, the diffraction efficiency of the diffractive optical elements according to the Examples are greater than or equal to about 70%, greater than or equal to about 80%, or greater than or equal to about 90%.

Design of Diffractive Optical Element II

Figure 5:
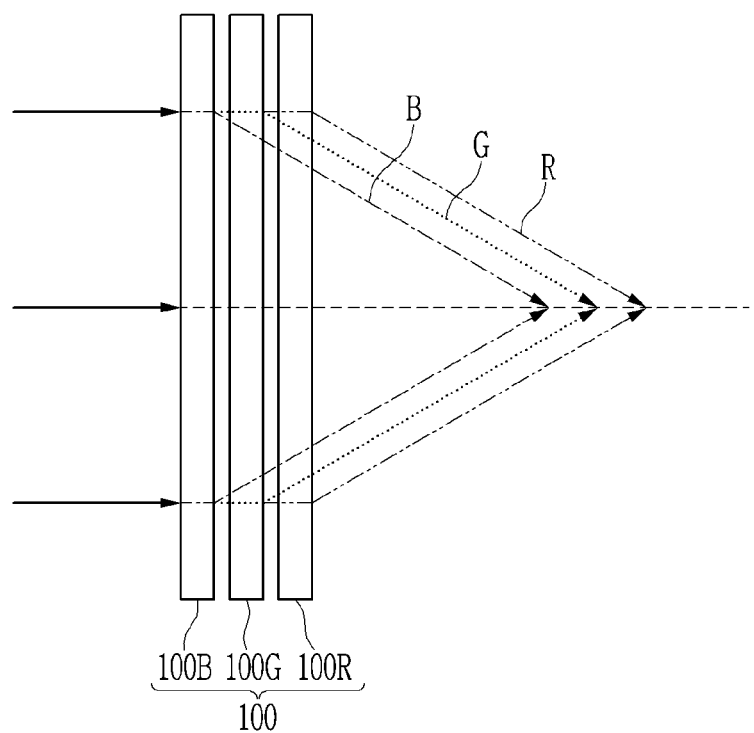
FIG. 5 is a schematic view of an embodiment of a stacked diffractive optical element.

Based on the properties of the anisotropic materials (liquid crystal) shown in Table 1 and FIG. 7, the stacked diffractive optical elements having the configurations shown in FIGS. 5 and 6 are set.

The stacked diffractive optical element consists of a blue diffractive optical element (B), a green diffractive optical element (G), and a red diffractive optical element (R), and the properties of each diffractive optical element are shown in Table 8.

TABLE 8

| Anisotropic materials | Examples 68 to 70 Anisotropic material A | Comparative Example 17 Anisotropic material F |
|---|---|---|
| Blue diffractive optical element (B) | | |
| Grating pitch (Λ, μm) | 1.8 | 1.8 |
| Phase difference (nm) | 225 | 225 |
| Diffraction angle (degree) | 30 | 30 |
| Green diffractive optical element (G) | | |
| Grating pitch (Λ, μm) | 2.2 | 2.2 |
| Phase difference (nm) | 275 | 275 |
| Diffraction angle (degree) | 30 | 30 |
| Red diffractive optical element (R) | | |
| Grating pitch (Λ, μm) | 2.6 | 2.6 |
| Phase difference (nm) | 325 | 325 |
| Diffraction angle (degree) | 30 | 30 |

Simulation II

FDTD software is used to perform an optical simulation of the stacked diffractive optical elements designed to satisfy the above-mentioned conditions.

The results are shown in Table 9.

TABLE 9

| | Birefringence | Diffraction efficiency (B/G/R, %) |
|---|---|---|
| Example 68 | 0.2 | 95.9/94.9/91.3 |
| Example 69 | 0.3 | 97.5/96.3/94.6 |
| Example 70 | 0.4 | 99.8/99.4/96.4 |
| Comparative Example 17 | 0.2 | 52.9/60.2/53.0 |

Referring to Table 9, the stacked diffractive optical element according to the Examples have a much greater diffraction efficiency as compared with the stacked diffractive optical element according to the Comparative Example.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A diffractive optical element comprising
a diffraction layer comprising a plurality of optical axes along an in-plane direction,
wherein the diffraction layer comprises an anisotropic material that satisfies one of Relationship Equations 1A to 3A:

$$\Delta n_1(450 \text{ nm}) < \Delta n_1(550 \text{ nm}) \leq \Delta n_1(650 \text{ nm}) \quad \text{Relationship Equation 1A}$$

$$\Delta n_1(450 \text{ nm}) \leq \Delta n_1(550 \text{ nm}) < \Delta n_1(650 \text{ nm}) \quad \text{Relationship Equation 2A}$$

$$\Delta n_1(450 \text{ nm}) = \Delta n_1(550 \text{ nm}) = \Delta n_1(650 \text{ nm}) \quad \text{Relationship Equation 3A}$$

wherein, in Relationship Equations 1A to 3A,
$\Delta n_1$ (450 nm) is a birefringence of the anisotropic material at a wavelength of 450 nanometers,
$\Delta n_1$ (550 nm) is a birefringence of the anisotropic material at a wavelength of 550 nanometers, and
$\Delta n_1$ (650 nm) is a birefringence of the anisotropic material at a wavelength of 650 nanometers,
wherein the anisotropic material has a birefringence dispersion satisfying Relationship Equations 4A and 5A:

$$0.70 \leq \Delta n_1(450 \text{ nm})/\Delta n_1(550 \text{ nm}) \leq 1.00 \quad \text{Relationship Equation 4A}$$

$$1.00 \leq \Delta n_1(650 \text{ nm})/\Delta n_1(550 \text{ nm}) \leq 1.25 \quad \text{Relationship Equation 5A},$$

wherein, in Relationship Equations 4A and 5A,
$\Delta n_1$ (450 nm) is the birefringence of the anisotropic material at a wavelength of 450 nanometers,
$\Delta n_1$ (550 nm) is the birefringence of the anisotropic material at a wavelength of 550 nanometers, and
$\Delta n_1$ (650 nm) is the birefringence of the anisotropic material at a wavelength of 650 nanometers.

2. The diffractive optical element of claim 1, wherein the plurality of optical axes of the diffraction layer is configured to change periodically along the in-plane direction.

3. The diffractive optical element of claim 1, wherein the diffraction layer comprises at least one grating pitch, and
the grating pitch is about 0.8 micrometers to about 10 micrometers.

4. The diffractive optical element of claim 1, wherein the anisotropic material is a liquid crystal,
the diffraction layer comprises a plurality of liquid crystals disposed in a thickness direction of the diffraction layer, and
the plurality of liquid crystals disposed in the thickness direction are not twisted in the in-plane direction of the diffraction layer.

5. The diffractive optical element of claim 1, wherein the birefringence of the anisotropic material at a wavelength of 550 nanometers is about 0.01 to about 0.5.

6. The diffractive optical element of claim 1, wherein a diffraction angle of the diffraction layer at a wavelength of 450 nanometers, a diffraction angle of the diffraction layer at a wavelength of 550 nanometers, and a diffraction angle of the diffraction layer at a wavelength of 650 nanometers are the same or different and are within about 1 degree to about 50 degrees of each other.

7. The diffractive optical element of claim 1, wherein a diffraction efficiency of the diffractive optical element at a wavelength of 450 nanometers, a diffraction efficiency at a wavelength of 550 nanometers, and a diffraction efficiency at a wavelength of 650 nanometers are each independently about 70% to about 100%.

8. The diffractive optical element of claim 7, wherein
a difference between the greatest diffraction efficiency and the smallest diffraction efficiency among the diffraction efficiency of the diffractive optical element at the wavelength of 450 nanometers, the diffraction efficiency at the wavelength of 550 nanometers, and the diffraction efficiency at the wavelength of 650 nanometers, is less than about 20%.

9. The diffractive optical element of claim 1, wherein the diffractive optical element is a lens or a prism.

10. The diffractive optical element of claim 1, wherein the diffractive optical element is a flat diffractive optical element having a constant thickness and a constant curvature.

11. A diffractive optical element comprising a plurality of optical axes along an in-plane direction,
wherein a birefringence of light having a wavelength of 550 nanometers to 650 nanometers is greater than or equal to a birefringence of light having a wavelength of 450 nanometers to less than 550 nanometers, a birefringence dispersion of the diffractive optical element satisfying Relationship Equations 4B and 5B, and
a diffraction efficiency at a wavelength of 450 nanometers, a diffraction efficiency at a wavelength of 550 nanometers, and a diffraction efficiency at a wavelength of 650 nanometers are each independently about 70% to about 100%:

$$0.70 \leq \Delta n_2(450 \text{ nm})/\Delta n_2(550 \text{ nm}) \leq 1.00 \quad \text{Relationship Equation 4B}$$

$$1.00 \leq \Delta n_2(650 \text{ nm})/\Delta n_2(550 \text{ nm}) \leq 1.25 \quad \text{Relationship Equation 5B}$$

wherein, in Relationship Equations 4B and 5B,
$\Delta n_2$ (450 nm) is the birefringence of the diffractive optical element at a wavelength of 450 nanometers,
$\Delta n_2$ (550 nm) is the birefringence of the diffractive optical element at a wavelength of 550 nanometers, and
$\Delta n_2$ (650 nm) is the birefringence of the diffractive optical element at a wavelength of 650 nanometers.

12. The diffractive optical element of claim 11, wherein
a difference between the greatest diffraction efficiency and the smallest diffraction efficiency among the diffraction efficiencies at the wavelength of 450 nanometers, the wavelength of 550 nanometers, and the wavelength of 650 nanometers, is less than about 20%.

13. A stacked diffractive optical element comprising a plurality of the diffractive optical elements of claim 1.

14. The stacked diffractive optical element of claim 13, comprising:
- a blue diffractive optical element exhibiting a greatest diffraction efficiency in a wavelength region of about 400 nanometers to about 500 nanometers,
- a green diffractive optical element exhibiting a greatest diffraction efficiency in a wavelength region of about 500 nanometers to about 600 nanometers, and
- a red diffractive optical element exhibiting a greatest diffraction efficiency in a wavelength region of about 600 nm to about 700 nanometers.

15. The stacked diffractive optical element of claim 13, further comprising at least one wavelength selective filter.

16. A device comprising the diffractive optical element of claim 1.

17. A device comprising the diffractive optical element of claim 11.

18. A device comprising the stacked diffractive optical element of claim 13.

* * * * *